H. G. Tyer,

Overshoe.

No. 4257. Reissued Feb. 7. 1871.

Witnesses:

Henry C. Statham

H. A. Topham

Henry G. Tyer
Inventor.
By his Attorney
F. A. Headwell Jr.

N. PETERS, PHOTO-LITHOGRAPHER, WASHINGTON, D. C.

United States Patent Office.

HENRY G. TYER, OF ANDOVER, MASSACHUSETTS.

Letters Patent No. 68,398, dated September 3, 1867, reissue No. 2,820, dated December 24, 1867; reissue No. 4,257, dated February 7, 1871.

IMPROVEMENT IN OVERSHOES.

The Schedule referred to in these Letters Patent and making part of the same.

*To all whom it may concern:*

Be it known that I, HENRY G. TYER, of Andover, in the county of Essex and State of Massachusetts, have invented a new and useful Improved Mode of Manufacturing Overshoes or Boots without straps, buckles, buttons, or other fastenings, whereby the drawing on or pulling off of such boots or shoes is greatly facilitated, a smooth and snug fit obtained, and all ugly additions harboring snow or mud are entirely avoided.

My invention consists in a new and improved manufacture of water-proof boots or shoes, made of vulcanized rubber combined with non-elastic and elastic or extensible cloth in the manufacture of the shoe before vulcanization, the whole shoe being vulcanized at one operation, and having, when completed, elastic vulcanized parts covered and lined with elastic or extensible cloth, such vulcanized elastic parts forming a sufficient portion of the sides or quarters, or other desired parts of the shoe or boot, to permit the stretching necessary in putting it on, the whole substantially as hereinafter described.

In carrying out my invention I prefer to make the elastic part or parts in the form of gores at the sides of the shoes or boots, as shown in the drawing, but do not limit myself to that mode, because it is obvious that the elastic portions may be placed in various parts of the boot or shoe, to permit the stretching required, the essential part of my invention consisting in the use of the exterior and interior elastic or extensible coverings and linings of the elastic parts of the shoe, and in vulcanizing the rubber-compound covered by them at the same time and with the other parts of the boot or shoe. It will not answer to use elastic fabric which contains rubber already vulcanized, whether vulcanized before or after the manufacture of the fabric, because the process of vulcanization necessary to complete and consolidate the various parts of the water-proof boot or shoe would injure greatly or practically destroy the useful properties of the previously-vulcanized parts.

To enable others skilled in the art of manufacturing rubber-shoes to use my invention, I will proceed to describe more particularly the method of making my improved boot or shoe, selecting a gaiter, boot, or shoe as an example, and referring to the accompanying drawing, of which—

Letter A represents the exterior extensible cloth-covering of the elastic gore, the interior or lining of said gore, of similar material, being shown at B.

Letter C denotes the inelastic lining.

D, the inelastic front, covered with woven or felt-cloth.

E, the back part of the shoe, also covered with inelastic cloth.

F, the foxing and sole, of vulcanizable rubber.

Between the linings and coverings which form the exterior and interior part of the shoe is a layer of rubber-compound, vulcanized after the parts of the shoe are put together, the same causing all the various pieces to become consolidated, and a perfect boot or shoe, with one or more vulcanized elastic parts or gores, to be produced.

Figure 1:
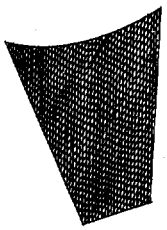
Figure 1 is a view of a piece of the elastic or extensible cloth forming a part of the elastic portion of the shoe.
Figure 4:
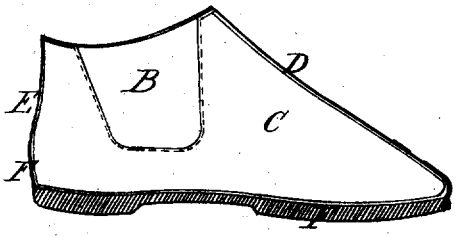
Figure 4 is a longitudinal section of the shoe, showing where the inelastic lining of the shoe is removed after vulcanization, such removal being denoted at B, and for the purpose of enabling the elastic gore to be stretched as occasion may require.

In making the shoe, I first prepare the lining C, (see fig. 4,) of flannel or other suitable material, by coating the same with a vulcanizable cement, of rubber or other adhesive vulcanizable compound. After having reduced the lining, or the piece composing it, to shape, I draw or place it over a last and insole in the usual manner, so that the cemented side of such lining may be outward. I next procure a fabric of cloth, with certain peculiarities of manufacture capable of great lateral extension, preferring that known as "diagonal cloth," in which the threads of the warp cross those of the filling at acute angles rather than at right angles, such being shown in fig. 1.

Figure 2:
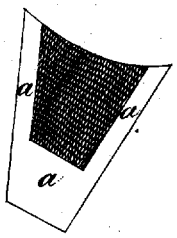
Figure 2 represents such piece of cloth with cement applied to it about its edges.
Figure 3:
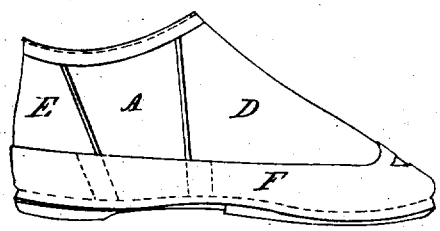
Figure 3 is a side view of a shoe provided with elastic parts or gores, formed of elastic cloth and a vulcanizable material, one of such gores being shown at A.

I do not confine myself to any one particular fabric or material, using any, however manufactured or prepared, if elastic or capable of the necessary extension and contraction. I proceed to coat the material on one side with a vulcanizable rubber-cement or composition, taking especial care not to stretch the cloth in handling it. I next cut from the cloth so coated the insertion or gore-piece, of such shape as may be desirable. Next I apply India-rubber cement to the bottom and side edges of the gore, laying it thereon about three-eighths of an inch wide, and on the uncemented face thereof, the same being as shown in fig. 2, in which *a a a* denote the cement. Next I place the gore in its proper position on the lining, and with a strip of paper or cloth arranged between the gore and the lining, in order to guard against their union except at the cemented edges of the gore in the after process of vulcanization. The object of retaining the lining whole or uncut at the gore is to prevent the lateral extension of the gore when the rubber is in a softened state during vulcanization.

I next cut from a sheet of vulcanizable rubber or rubber-compound a piece of the same shape as the inner part of the gore, before referred to, but somewhat larger, so that the edges may extend beyond the first piece when laid thereon and united thereto. Sometimes I spread a sufficient thickness of coating of rubber on the gore-lining, in the first instance, rendering the sheet just spoken of unnecessary; but I prefer that the lining and sheet-gum should be distinct from each other.

I next take strips of thin sheet-rubber or rubber-compound, say three-eighths of an inch wide, and turn and roll over one edge thereof for binding and making a neat finish entirely around the top of the boot and that of the gore, this binding affording an additional strength to such part of the boot or shoe, it being that which has to resist the heavier strains.

I next prepare "diagonal" cloth or other elastic fabric, which I intend using for the outside of the gore or insertion. This I do by cementing it precisely as hereinbefore described for the inner part or lining of the same, and cut it into similar shape to that, taking particular care in doing so that the threads of the warp and filling of the two pieces, when they are united, bear such relative positions to each other as to render both pieces capable of extension in the same direction, failing in which the elasticity of the gore or insertion would thereby be, in a great measure, destroyed. After this outside piece may have been securely fastened in its proper position, I proceed to finish the boot or shoe in such manner and style as may be required; this and the subsequent operation being well known to India-rubber manufacturers, as well as the after vulcanization of the boot or shoe in a complete state.

I finally cut away or remove the lining of the shoe in rear of the gore, in order to allow the gore full freedom to expand.

Although I prefer, in making the shoe, to use a lining which is whole or uncut at the gore-parts, and retain it in that condition until after the shoe is vulcanized, for the reasons I have hereinbefore stated, and then to remove such parts of said lining as interfere with the stretching of the gore.

I do not wish to be considered as desiring to limit my invention to such mode of construction, as it is evident that, with care, the shoe may be made with a lining originally cut of the form required in the completed shoe.

I do not claim, broadly, the insertion of an elastic gore in a boot or shoe, such being an article of extensive manufacture at the present time; neither do I claim, simply, the formation of an elastic fabric, such being well known and the subject of many patents; nor do I claim the lining of an India-rubber shoe with ordinary stockinet, such being daily manufactured.

I claim—

The improved water-proof boot or shoe, hereinbefore described, made of vulcanized rubber and elastic and inelastic cloth, when constructed with an elastic part or parts of vulcanized-rubber compound, covered and lined with elastic or extensible fabric, substantially as hereinbefore described.

HENRY G. TYER.

Witnesses:
CHARLES WINSLOW,
ARTHUR T. TUFTS.